US012673457B2

(12) United States Patent

Wurster et al.

(10) Patent No.: US 12,673,457 B2

(45) Date of Patent: Jul. 7, 2026

(54) HEATED BLOW MOLD THREAD INSERT FOR FORMING THREADS OF A CONTAINER

(71) Applicant: AMCOR RIGID PACKAGING USA, LLC, Ann Arbor, MI (US)

(72) Inventors: Michael Wurster, Chelsea, MI (US); Aaron Teitlebaum, Sylvania, OH (US); Gregory T. Hall, Adrian, MI (US); Steven Charles Dettling, Manchester, MI (US)

(73) Assignee: AMCOR RIGID PACKAGING USA, LLC, Manchester, MI (US)

( * ) Notice: Subject to any disclaimer, the term of this patent is extended or adjusted under 35 U.S.C. 154(b) by 88 days.

(21) Appl. No.: 18/609,053

(22) Filed: Mar. 19, 2024

(65) Prior Publication Data

US 2024/0217161 A1 Jul. 4, 2024

Related U.S. Application Data

(63) Continuation-in-part of application No. 18/273,133, filed as application No. PCT/US2021/059348 on Nov. 15, 2021.

(51) Int. Cl.
B29C 49/48 (2006.01)
B29C 33/02 (2006.01)
(Continued)

(52) U.S. Cl.
CPC .......... B29C 49/4823 (2013.01); B29C 33/02 (2013.01); B29C 33/42 (2013.01);
(Continued)

(58) Field of Classification Search
CPC ......... B29C 49/48; B29C 33/02; B29C 33/42; B29C 49/4823; B29C 2033/023;
(Continued)

(56) References Cited

U.S. PATENT DOCUMENTS 4,447,711 A * 5/1984 Fischer ................... F24C 7/067
219/465.1
4,843,218 A * 6/1989 Husslein .................. H05B 3/72
219/466.1

(Continued)

FOREIGN PATENT DOCUMENTS

JP H02111522 A 4/1990
JP 2002-284132 A 10/2002

OTHER PUBLICATIONS

European Search Report from counterpart EP219642626, dated Jul. 15, 2025.
International Search Report and Written Opinion of the ISA issued in PCT/US2021/059348, mailed Aug. 12, 2022; ISA/KR.

*Primary Examiner* — Alison L Hindenlang
*Assistant Examiner* — Shibin Liang
(74) *Attorney, Agent, or Firm* — Harness, Dickey & Pierce, PLC

(57) ABSTRACT

The present disclosure includes a thread insert for a blow mold assembly configured to form a polymeric container. The thread insert includes: an inner mold surface defining threads, the inner mold surface configured to form a finish of the container; a first bore defined by the thread insert; and a first heating element seated within the first bore and configured to heat the inner mold surface.

22 Claims, 8 Drawing Sheets

(51) Int. Cl.

| | |
|---|---|
| *B29C 33/42* | (2006.01) |
| *B29K 67/00* | (2006.01) |
| *B29L 1/00* | (2006.01) |
| *B29L 31/00* | (2006.01) |

(52) U.S. Cl.
CPC ............................ *B29C 2033/023* (2013.01); *B29C 2049/4851* (2013.01); *B29C 2049/4887* (2013.01); *B29K 2067/003* (2013.01); *B29L 2001/00* (2013.01); *B29L 2031/7158* (2013.01)

(58) Field of Classification Search
CPC .... B29C 2049/4851; B29C 2049/4887; B29K 67/00; B29K 2067/003; B29L 1/00; B29L 31/00; B29L 2001/00; B29L 2031/7158
See application file for complete search history.

(56) References Cited

U.S. PATENT DOCUMENTS

| | | | |
|---|---|---|---|
| 5,447,766 | A | 9/1995 | Orimoto et al. |
| 6,168,740 | B1 | 1/2001 | Koch et al. |
| 7,578,668 | B2 | 8/2009 | Hutchinson et al. |
| 9,409,342 | B2 | 8/2016 | Le Pechour et al. |
| 9,567,128 | B2 | 2/2017 | Dygert et al. |
| 2001/0016239 | A1 | 8/2001 | Koch et al. |
| 2001/0028930 | A1 | 10/2001 | Koch et al. |
| 2002/0160136 | A1 | 10/2002 | Wong |
| 2007/0108668 | A1* | 5/2007 | Hutchinson .......... B29C 33/046 425/DIG. 246 |
| 2008/0054535 | A1 | 3/2008 | Barker et al. |

* cited by examiner

HEATED BLOW MOLD THREAD INSERT FOR FORMING THREADS OF A CONTAINER

CROSS-REFERENCE TO RELATED APPLICATIONS

This application is a continuation-in-part of U.S. patent application Ser. No. 18/273,133 filed on Jul. 19, 2023, which is a U.S. National Phase Application under 35 U.S.C. 371 of International Application No. PCT/US2021/059348 filed on Nov. 15, 2021. The entire disclosures of each of the above applications are incorporated herein by reference.

FIELD

The present disclosure relates to a heated blow mold thread insert for forming threads of a container.

BACKGROUND

This section provides background information related to the present disclosure, which is not necessarily prior art.

As a result of environmental and other concerns, plastic containers, more specifically polyester and even more specifically polyethylene terephthalate (PET) containers, are being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left( \frac{\rho - \rho_a}{\rho_c - \rho_a} \right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is cloudy or opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately one (1) to five (5) seconds. Manufacturers of PET juice bottles, which must be hot-filled at approximately 190° F. (88° C.), currently use heat setting to produce PET bottles having an overall crystallinity in the range of approximately 25%-35%.

The container is blow-molded into a mold assembly, which in some instances may be heated. While current mold heating systems are suitable for their intended use, they are subject to improvement. For example, some current systems include heated or cooled oil that is plumbed up through an upper portion of a mold, thereby heating the entire thread and shoulder, which is inefficient. Current electrically heated molds also suffer many disadvantages. For example, current electrically heated molds often include heater rods or cartridge heaters positioned in various arrangements within the assembly. Current electrically heated molds also, similar to oil heated molds, heat the entire mold assembly along with any components within the assembly, which is inefficient.

The present disclosure provides for mold heaters that are more efficient and effective as compared to existing heaters by, for example, insulating the thread split of the mold and targeting the area with heat. One skilled in the art will appreciate that the heaters of the present disclosure provide numerous additional advantages and unexpected results.

SUMMARY

This section provides a general summary of the disclosure, and is not a comprehensive disclosure of its full scope or all of its features.

The present disclosure includes a thread insert for a blow mold assembly configured to form a polymeric container. The thread insert includes: an inner mold surface defining threads, the inner mold surface configured to form a finish of the container; a first bore defined by the thread insert; and a first heating element seated within the first bore and configured to heat the inner mold surface.

The present disclosure further includes a thread insert for a blow mold assembly configured to form a polymeric container. The thread insert includes: an inner mold surface defining threads, the inner mold surface configured to form a finish of the container; a first bore defined by the thread insert; a first heating element seated within the first bore and configured to heat the inner mold surface and the threads; a second bore defined by the thread insert, the second bore is non-parallel to the first bore; a second heating element seated within the second bore and configured to heat the inner mold surface and the threads; and an outer mold surface opposite to the inner mold surface, the outer mold surface defines a notch including a first opening of the first bore and a second opening of the second bore. Each thread insert forms one half of a container thread finish. Therefore, two thread inserts are included to form a full thread finish of the container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
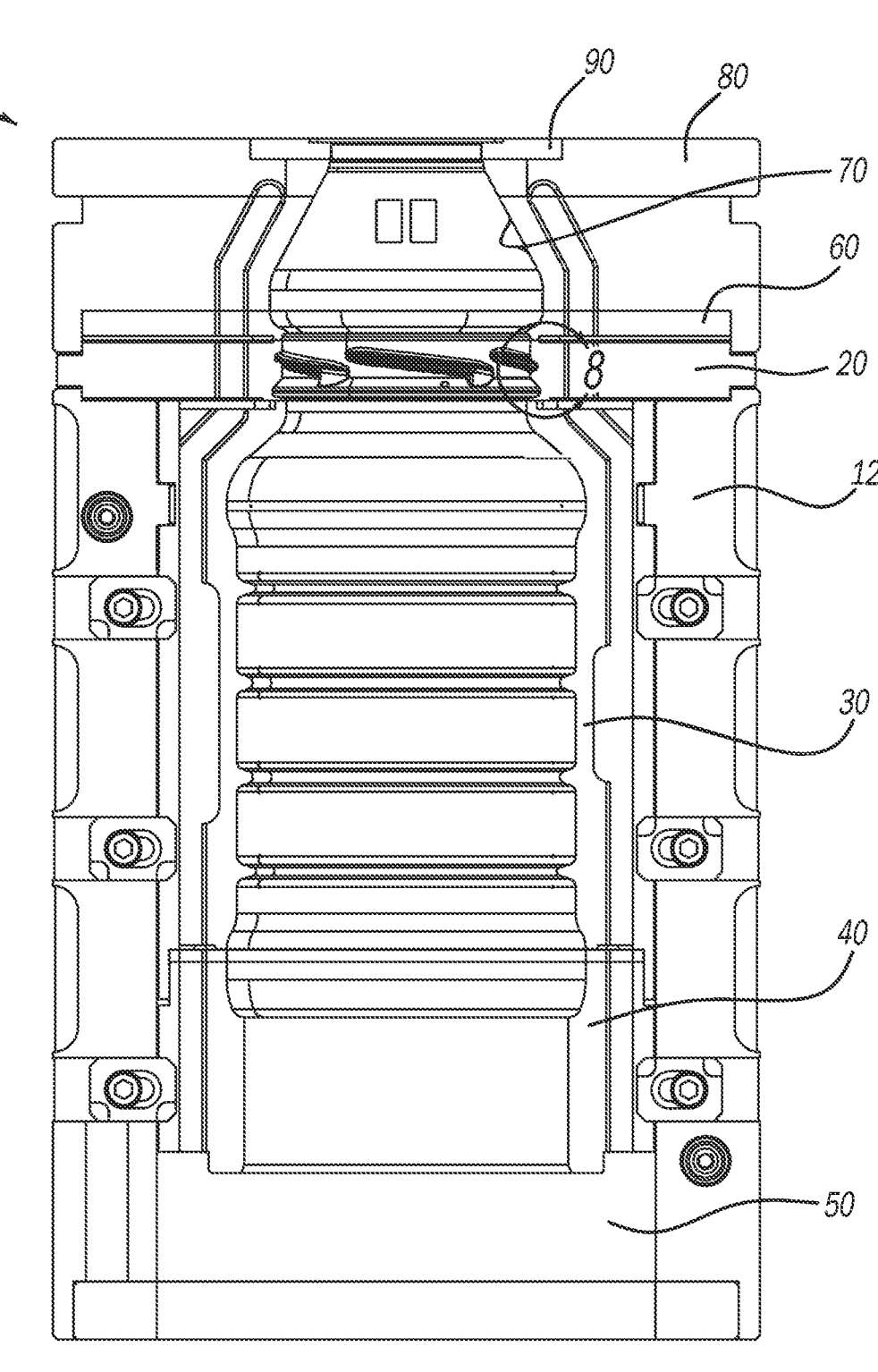
FIG. 1 is a cross-sectional view of a blow mold assembly in accordance with the present disclosure.
Figure 2:
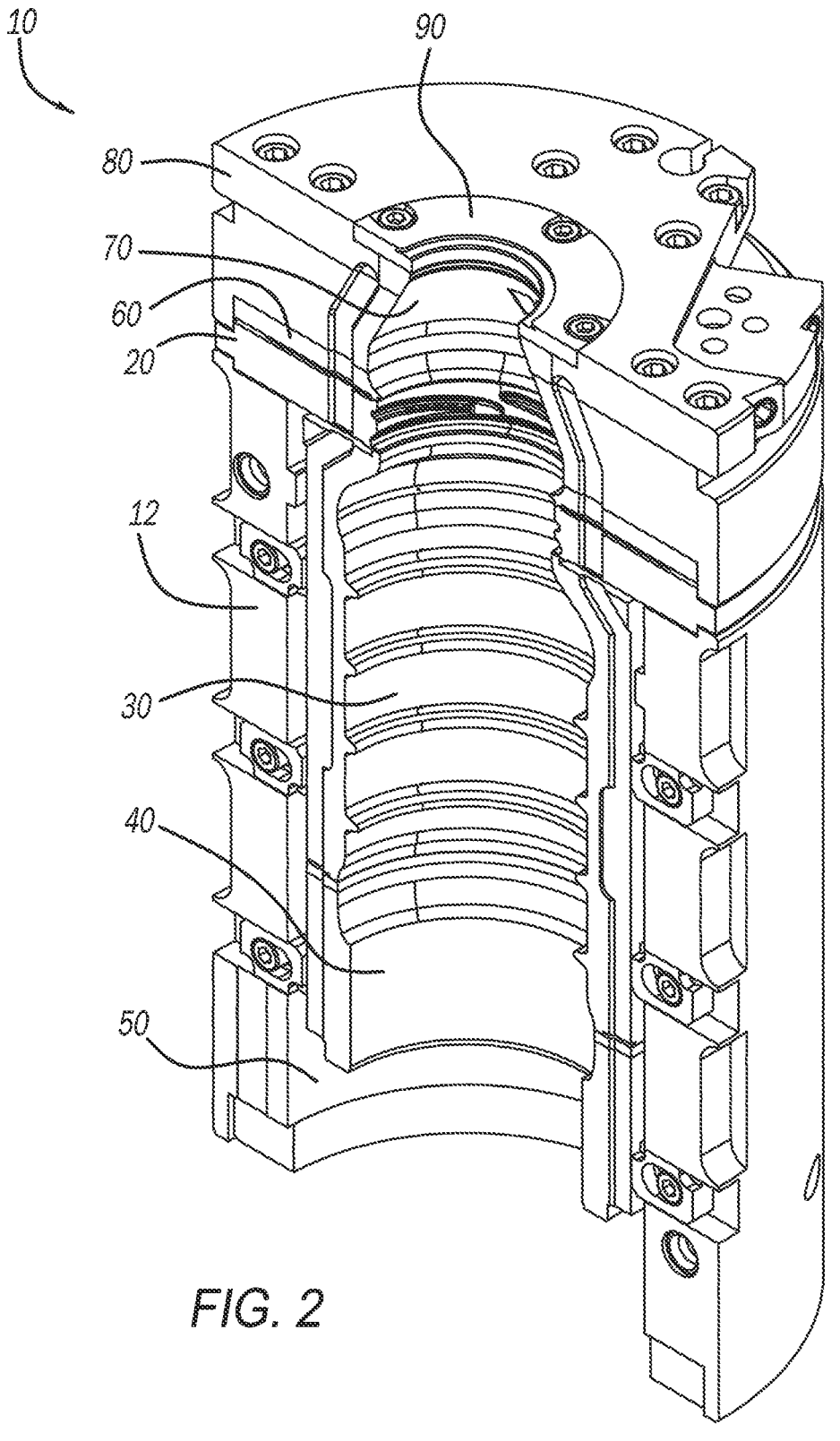
FIG. 2 is a perspective view of the blow mold assembly of FIG. 1.
Figure 3:
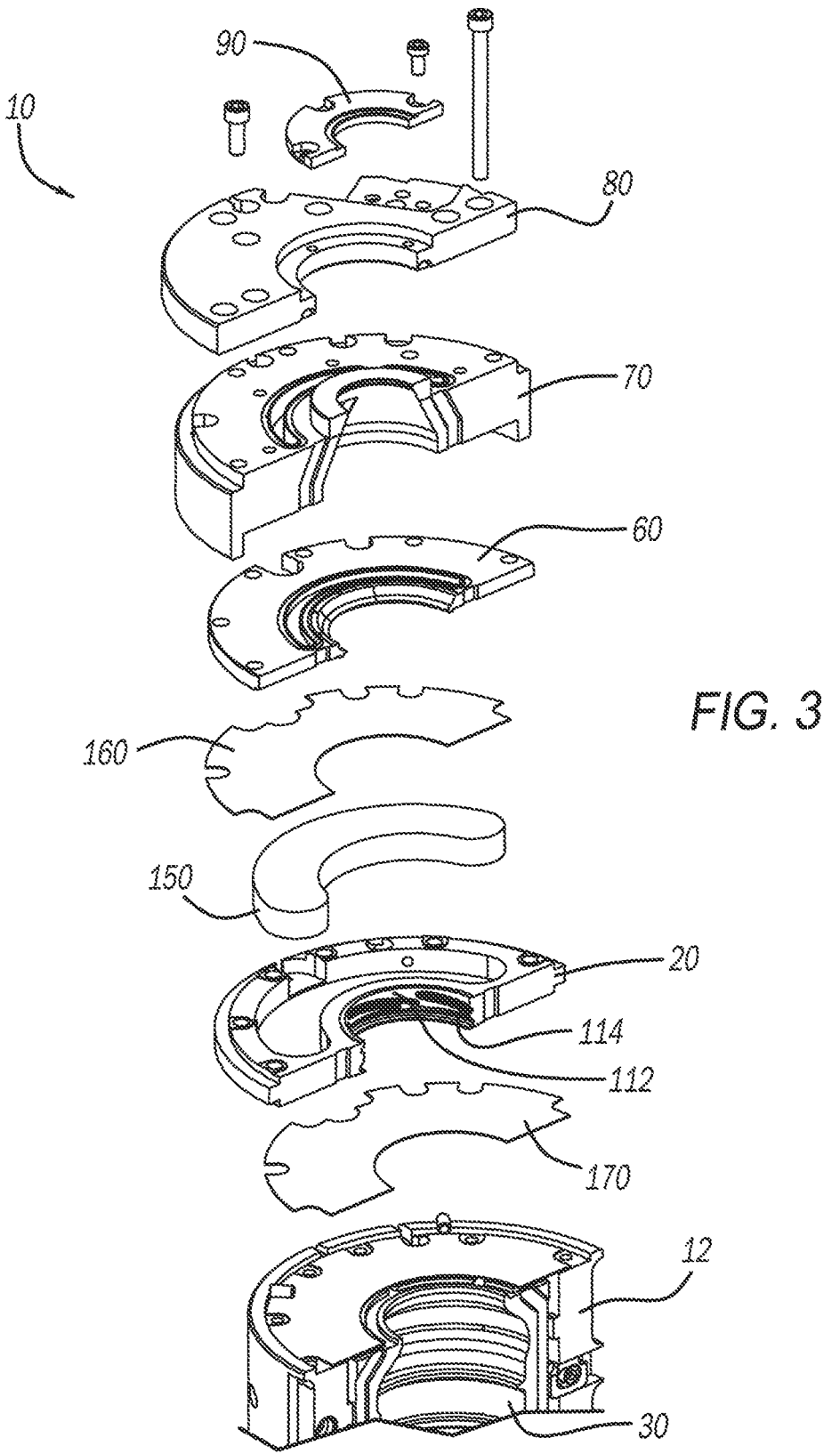
FIG. 3 is an exploded view of the blow mold assembly of FIG. 1.

Example embodiments will now be described more fully with reference to the accompanying drawings.

With initial reference to FIGS. 1-4, a blow mold assembly in accordance with the present disclosure is generally illustrated at reference numeral 10. The blow mold assembly 10 is configured to form a wide-mouth blow trim polymeric container by blow molding. The container may be made of polyethylene terephthalate (PET) or any other suitable thermoplastic. As a wide-mouth container, the container will have a finish size greater than 43 mm, such as, but not limited to, 63 mm, 70 mm, or 82 mm. As an injected finish container, the finish size may be 43 mm or less. In one example in accordance with the present disclosure, the blow mold assembly 10 includes a 170 mm blow mold configured for use on any suitable blow molding machine, such as a Sidel Matrix blow molding machine, for example. The blown container may have any suitable size from 16 to 64 ounce capacity, such as a 24 ounce capacity. The blown container may also have any suitable shape. The blown container may be heat-set or amorphous and used for any suitable filling process, such as, but not limited to, hot-fill, cold-fill, aseptic, retort and the like. The container may contain any suitable product such as sport drinks, juice, food, water, and carbonated soda drinks.

FIGS. 1-4 illustrate one-half of the blow mold assembly 10. The blow mold assembly 10 is a clamshell assembly, which includes another half that is identical to, or substantially similar to, the blow mold assembly 10 of FIGS. 1-4. The description of the blow mold assembly 10, and drawings thereof, equally applies to the other half of the blow mold assembly 10, which is a mirror-image of the blow mold assembly 10 illustrated.

The blow mold assembly 10 includes a holder 12, which holds various mold inserts configured to form different portions of the container. The mold inserts include a thread insert 20, a body insert 30, a heel insert 40, a base insert 50, a knife insert 60, a dome insert 70, a connection top plate 80, and a striker plate 90. Each one of the inserts/plates 20-90 may be made of any suitable material, such as stainless steel, for example, to create a heatset container for hot-fill products, or a non-heatset container for aseptic filled product. One or more of the inserts/plates 20-90 may have any suitable coating on mold surfaces thereof to reduce or prevent instances of sticking between the polymeric material and the stainless steel mold surfaces, such as a diamond-like coating (DLC).

With continued reference to FIGS. 1-4, and additional reference to FIGS. 5-7, the thread insert 20 will now be described further. The thread insert 20 defines an inner mold surface 112, which is configured to form the finish of the container. The inner mold surface 112 of each thread insert 20 (i.e., the half of the thread insert 20 illustrated and the other, mirror-image half not illustrated) is semicircular. The inner mold surface 112 includes threads 114. The threads 114 are configured in any suitable manner to form threads of the container. The threads of the container are configured to cooperate with any suitable closure for closing the container.

Figure 4:
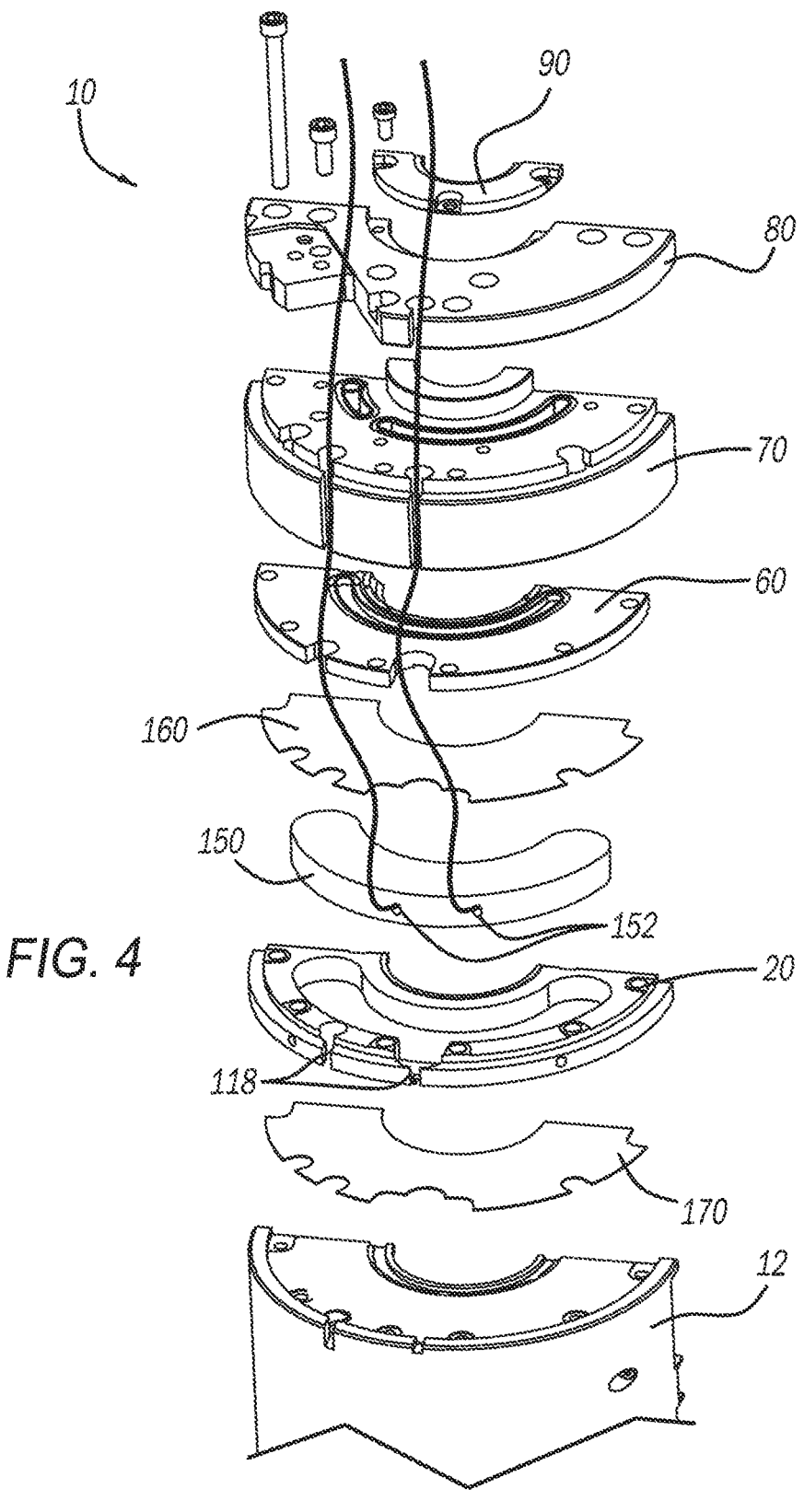
FIG. 4 is another exploded view of the blow mold assembly of FIG. 1.
Figures 5, 6:
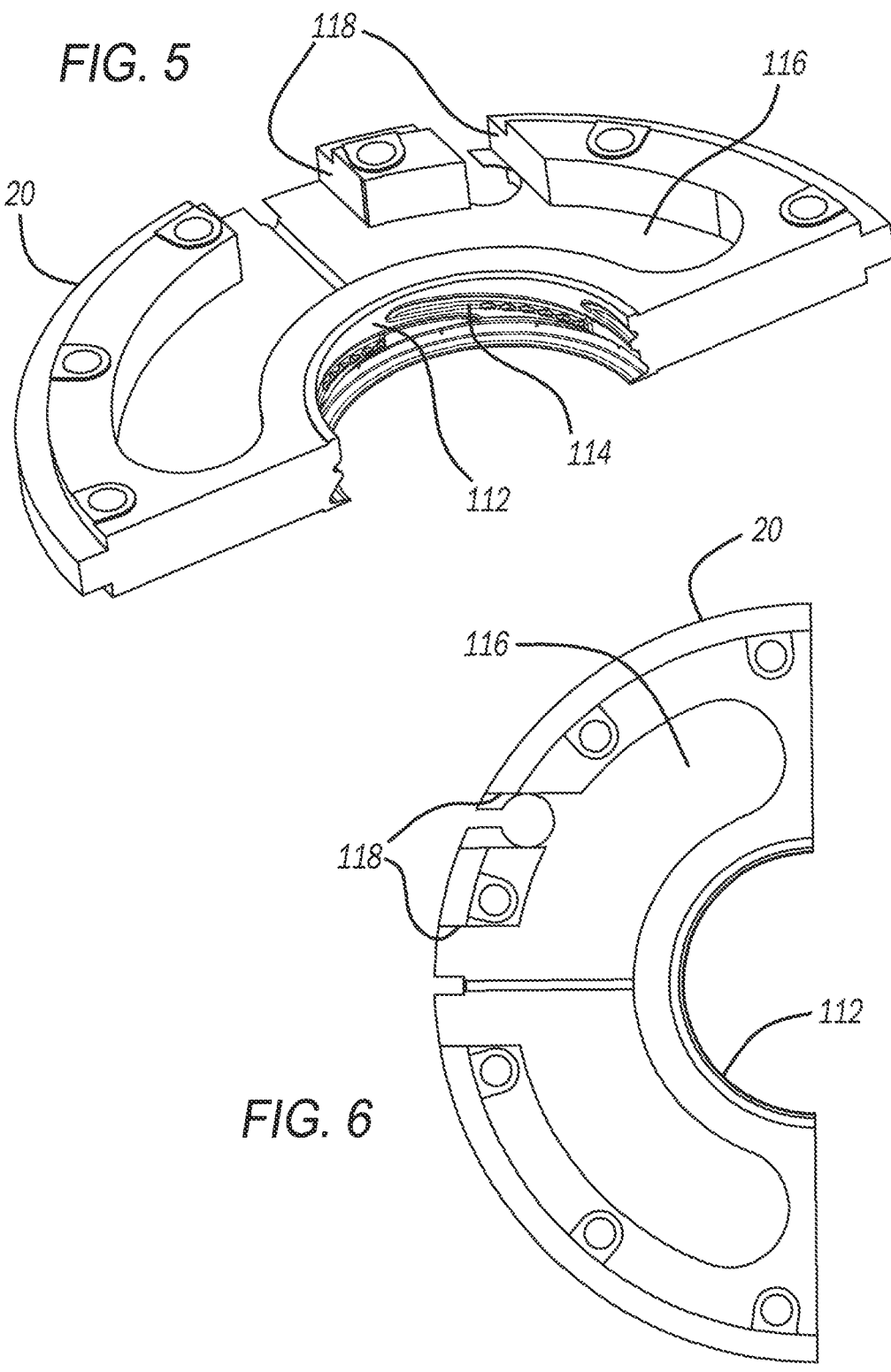
FIG. 5 is a perspective view of a thread insert of the blow mold assembly of FIG. 1.
FIG. 6 is a plan view of the thread insert of FIG. 5.
Figures 7, 8:
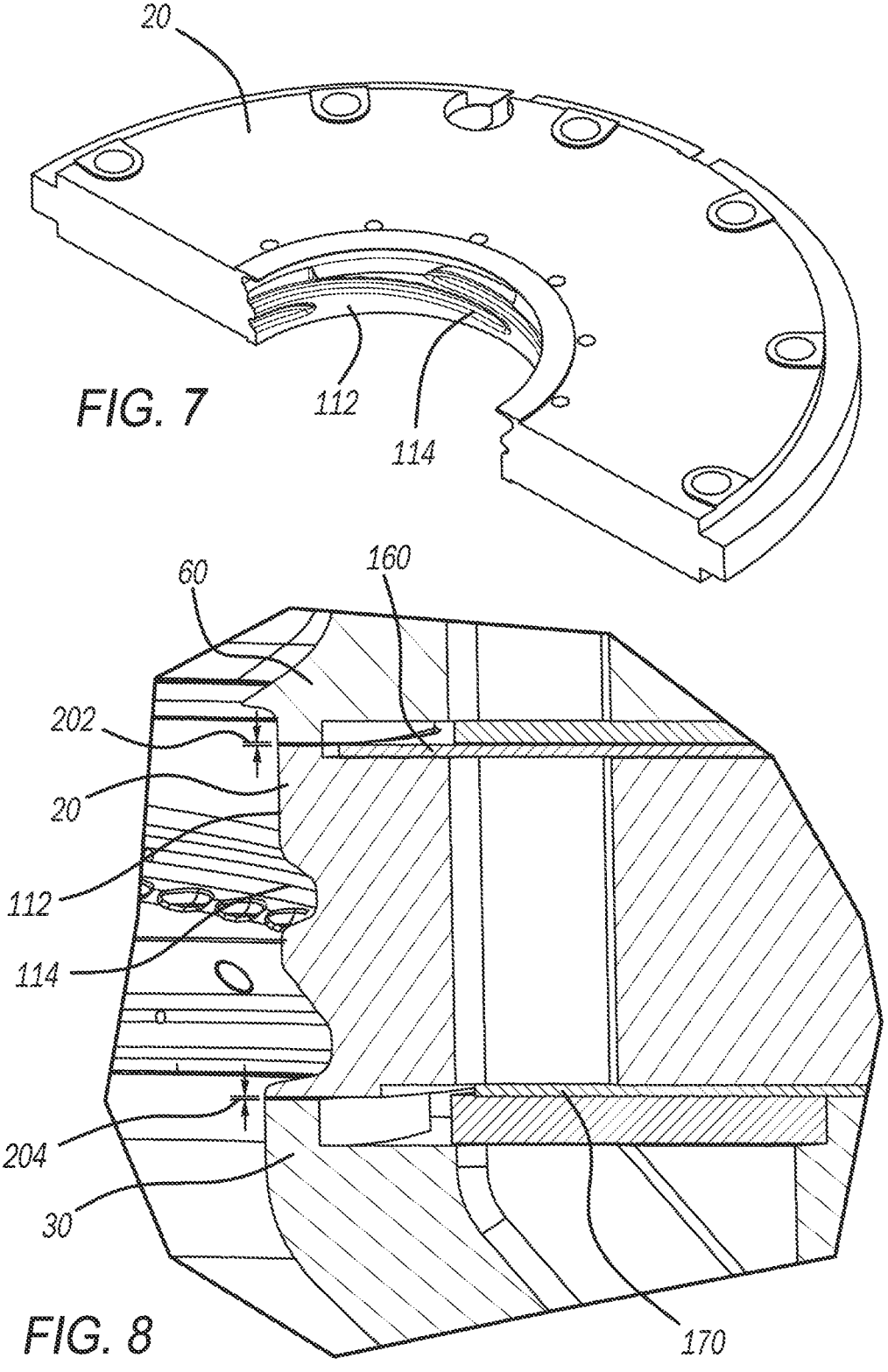
FIG. 7 is another perspective view of the thread insert of FIG. 5.
FIG. 8 illustrates area 8 of FIG. 1.

With particular reference to FIGS. 5-7, the thread insert 20 defines a recess, groove, or receptacle 116. The other half of the thread insert 20 that is not illustrated, which is a mirror-image of the half that is illustrated, also defines a recess, groove, or receptacle. The receptacle 116 has any size and shape suitable to accommodate an electric heater 150. In the example illustrated, the receptacle 116 is semicircular and extends about the semicircular inner mold surface 112. The receptacle 116 may have any other suitable size and shape as well. The thread insert 20 further defines slots 118, which are configured to receive wiring associated with the heater 150, as illustrated in FIG. 4 for example. The slots 118 may be arranged opposite to the inner mold surface 112 as illustrated, or at any other suitable location. The thread insert 20 may be made of any suitable material, such as stainless steel. Forming the thread insert 20 of stainless steel is particularly advantageous for applications where the blow mold assembly 10 is configured as a heatset mold to create the container as a heatset container.

The heater 150 may be any electric heater suitable for heating the inner mold surface 112. For example, the heater 150 may be a cast heater, a square cartridge heater, a tubular heater, etc. The electric heater 150 may have any suitable wattage, such as at least 400 W for example. As illustrated in FIG. 4, the heater 150 includes connectors 152, which are generally aligned with one or more of the slots 118 of the receptacle 116. The position of the connectors 152 and the slots 118 opposite to the inner mold surface 112 advantageously accommodates the wiring for powering the heater 150.

The thread insert 20 and the heater 150 are insulated from other components of the blow mold assembly 10 to prevent adjacent components from being heated by the heater 150. Specifically, on an upper side of the thread insert 20 and the heater 150 is a first insulator 160. On a lower side of the thread insert 20 is a second insulator 170. Any suitable insulators may be used. For example, the first and second insulators 160, 170 may be mica insulators. The first and second insulators 160, 170 may be 0.5 mm insulators, or have any other suitable dimension.

The first insulator 160 is between the thread insert 20 and the knife insert 60. The second insulator 170 is between the thread insert 20 and the body insert 30. The thread insert 20 is spaced apart from the knife insert 60 to define a first gap 202 therebetween, as illustrated in FIG. 8. The thread insert 20 is spaced apart from the body insert 30 by a second gap 204 therebetween.

The first insulator 160 and the second insulator 170 do not extend entirely to the molding surfaces of the blow mold assembly 10. The first insulator 160 terminates proximate to the first gap 202, and the second insulator 170 terminates proximate to the second gap 204. If required, the first and second gaps 202, 204 advantageously provide venting (i.e., vent dumps) to release heat from the heater 150 out of the blow mold assembly 10. Thus, the first insulator 160 and the first gap 202 restrict transfer of heat from the heater 150 to the knife insert 60. Similarly, the second gap 204 and the second insulator 170 restrict transfer of heat from the heater 150 to the body insert 30.

The blow mold assembly 10 of the present disclosure provides numerous advantages. For example, the thread insert 20 is insulated and isolated from other parts of the blow mold assembly 10, and separately heated to increase the temperature of the inner mold surface 112. Although the blow mold assembly 10 may include other heaters for heating the body insert 30, the heel insert 40, and the base insert 50, only the thread insert 20 is individually heated by the heater 150, which provides individual control of the temperature of the thread insert 20, which improves the blow-molded definition of the container threads and increases heat induced crystallinity, and increases material strength of the container threads. The thread insert 20 is heated to 275° F.-410° F. to achieve a crystallinity of about 26%-41% in the final blow molded container threads. The following Table 1 lists various exemplary temperatures to which the thread insert 20 may be heated to (ranging from 275° F. to 410° F., for example), and the corresponding crystallinity achieved (26%-41%, for example) of the final blow molded container threads of different exemplary containers formed from the blow mold assembly 10.

TABLE 1

| Exemplary Crystallinity Levels Achieved at Different Temperatures of Thread Insert 20. | | | | |
|---|---|---|---|---|
| | Crystallinity of Final Blow Molded Container Threads | | | |
| Temperature (° F.) of Thread Insert 20 | Container #1 | Container # 2 | Container # 3 | Average % Crystallinity |
| 275 | 27.85 | 22.79 | 27.54 | 26 |
| 320 | 30.86 | 30.31 | 24.78 | 29 |
| 320 | 35.46 | 33.41 | 33.86 | 34 |
| 320 | 35.57 | 36.24 | 36.2 | 36 |
| 320 | 28.1 | 30.3 | 28.3 | 29 |
| 365 | 32.11 | 31.5 | 30.01 | 31 |
| 410 | 33.65 | 35.44 | 32.75 | 34 |
| 410 | 39.06 | 39.37 | 40.79 | 40 |
| 410 | 42.25 | 42 | 39.36 | 41 |
| 410 | 34.7 | 34.2 | 35.7 | 35 |

The container formed by the blow mold assembly 10 is typically referred to as a wide-mouth container because the thread size is greater than 43 mm. The threads of such wide-mouth containers are formed in the blow mold assembly 10 along with the rest of the container instead of being formed in an injection mold when a preform is produced (i.e., injected finish). Forming wide-mouth containers in traditional blow molds has presented various challenges due to the larger diameter and thinner wall thickness of the threads. For example, the threads tend to be less detailed and have less structural strength, which may affect the ability to form a hermetic seal with a closure. The present disclosure advantageously addresses and solves these issues by individually heating the thread insert 20 with the heater 150, and thermodynamically isolating the thread insert 20 from other molding components of the blow mold assembly so that heat generated by the heater 150 does not escape to other molding components. One skilled in the art will appreciate that the present disclosure provides numerous additional advantages as well.

Figure 9:
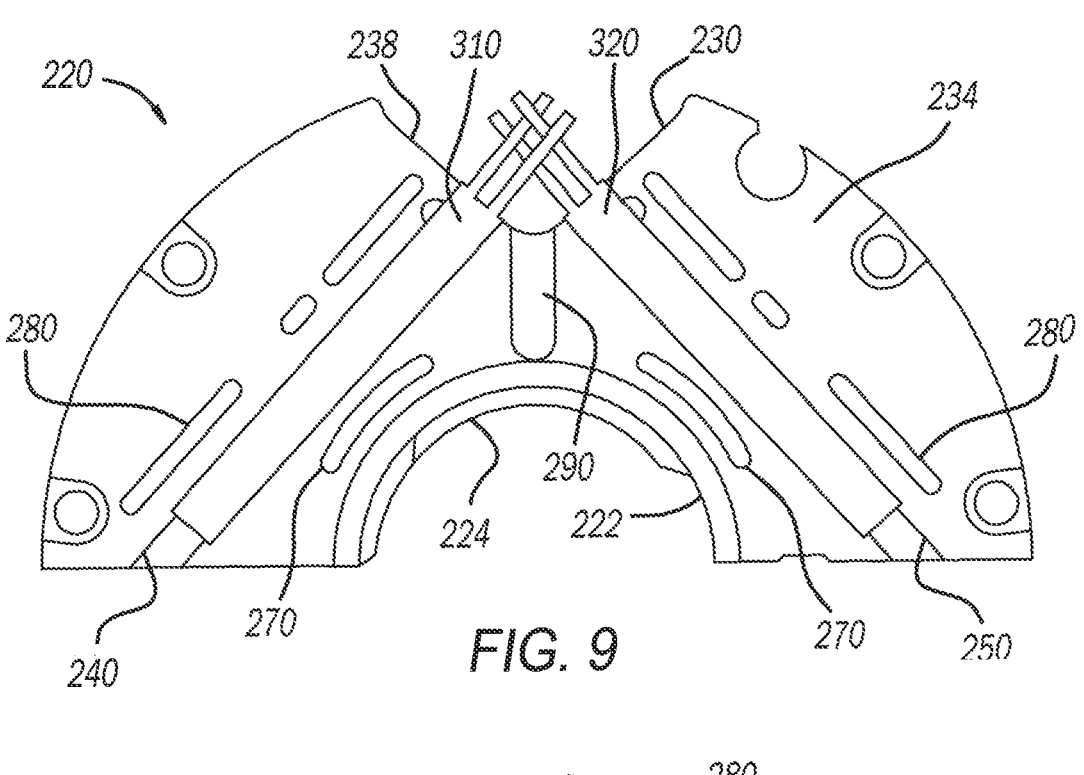
FIG. 9 is a plan view of another thread insert in accordance with the present disclosure configured for use with the blow mold assembly of FIG. 1.
Figure 10:
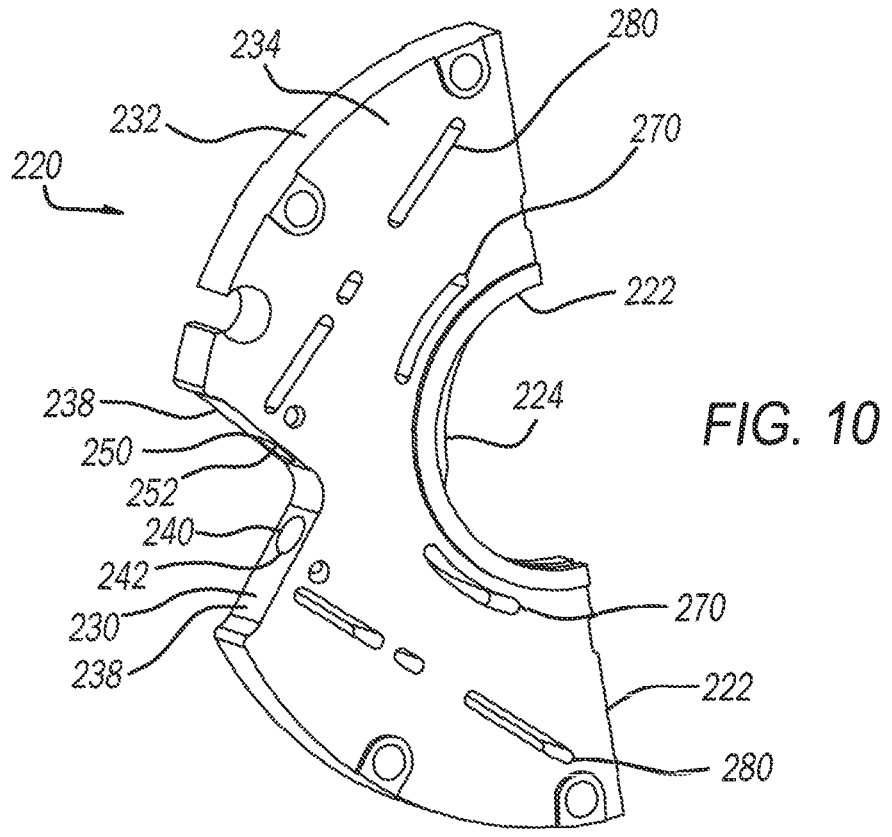
FIG. 10 is a perspective view of the thread insert of FIG. 9.
Figure 11:
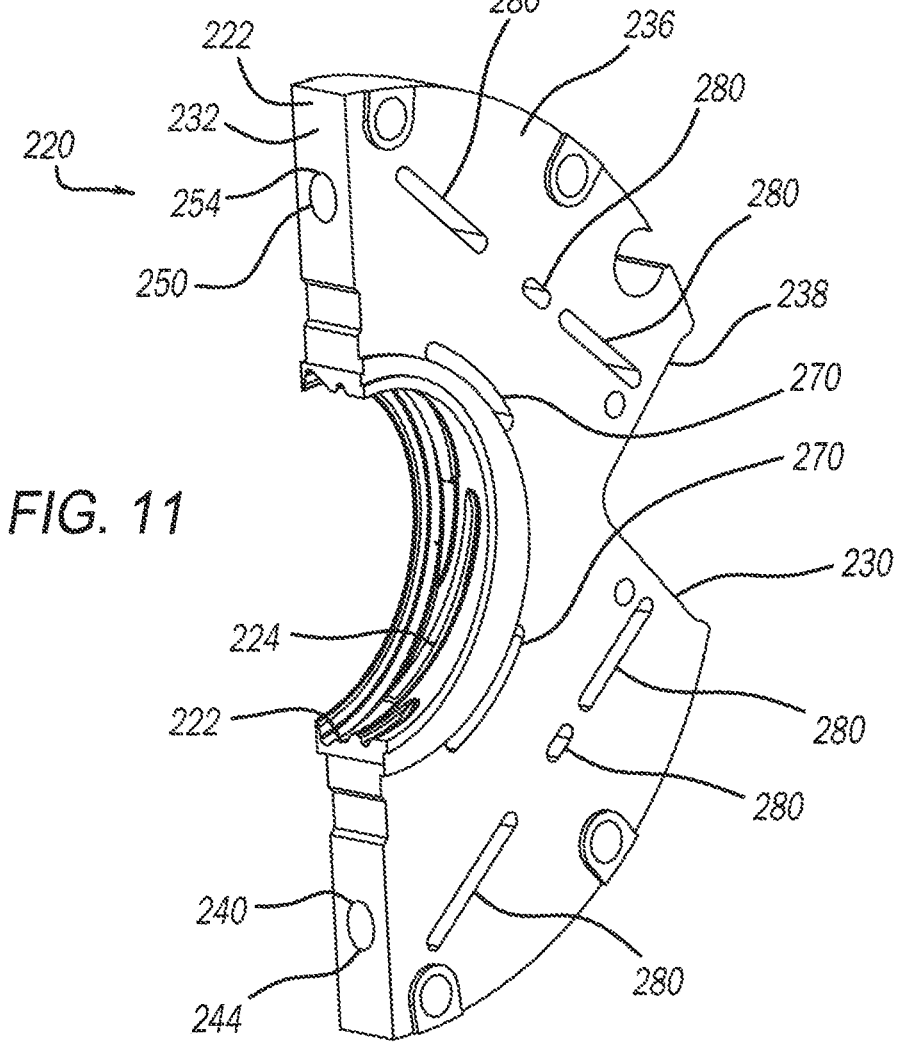
FIG. 11 is another perspective view of the thread insert of FIG. 9.

FIGS. 9-11 illustrate another thread insert 220 in accordance with the present disclosure. FIGS. 9-11 illustrate half of the thread insert 220. The other half of the thread insert 220, which is not illustrated, is a mirror-image of the half that is illustrated. The thread insert 220 is configured for use in the blow mold assembly 10 in place of the thread insert 20. The thread insert 220 is thus configured to be arranged at the same position in the blow mold assembly 10 as the thread insert 20. The thread insert 220 is configured to form the finish area of the container. The thread insert 20 may be made of any suitable material, such as stainless steel, nickel, and in particular AMPCOLOY® 83 offered by AMPCO Metal S.A. of Switzerland. Forming the thread insert 20 of stainless steel is particularly advantageous for applications where the blow mold assembly 10 is configured as a heatset mold to create the container as a heatset container.

The thread insert 220 includes an inner mold surface 222 and an outer mold surface 230, which is opposite to the inner mold surface 222. The inner mold surface 222 includes threads 224. The threads 224 are configured in any suitable manner to form threads of the container. The threads of the container are configured to cooperate with any suitable closure for closing the container.

The thread insert 220 further includes a side surface 232, which is between an upper surface 234 and a lower surface 236. The thread insert 220 defines a first bore 240 and a second bore 250 between the upper surface 234 and the lower surface 236. The first bore 240 defines an outer opening 242 at the outer mold surface 230 and an inner opening 244 at the inner mold surface 222. The second bore 250 defines an outer opening 252 at the outer mold surface 230 and an inner opening 254 at the inner mold surface 222.

A first heating element 310 is seated within the first bore 240. A second heating element 320 is seated within the second bore 250. The first heating element 310 and the second heating element 320 may be any suitable heating elements configured to heat the thread insert 220. For example, the first heating element 310 and the second heating element 320 may be straight cartridge heaters. The heating element 320 may be a variable wattage heater allowing the heating element 320 to have different temperatures along its length. The thread insert 220 is particularly configured to direct heat from the first heating element 310 and the second heating element 320 to the threads 224. For example, the first bore 240 and the second bore 250 are positioned adjacent to the threads 224 to facilitate heat transfer from the first and second heating elements 310, 320 to the threads 224.

The first and second bores 240, 250 are arranged nonparallel to each other. The outer mold surface 230 defines a cut-out or notch 238 at a center of the thread insert 220 where the outer opening 242 of the first bore 240 and the outer opening 252 of the second bore 250 are defined. This cut-out 238 allows the first and second bores 240, 250 to be angled at a non-parallel angle, and the first and second heating elements 310, 320 to be positioned at the non-parallel angle, which maximizes transfer of heat from the first and second heating elements 310, 320 to the threads 224. The first bore 240 extends along a first line, and the second bore 250 extends along a second line. The first line and the second line intersect within the cut-out 238.

The thread insert 220 defines one or more inner air gaps 270 adjacent to the portion of the inner mold surface 222 including the threads 224. In the example illustrated, two inner air gaps 270 are included. The inner air gaps 270 are curved to match a curvature of the portion of the inner mold surface 222 including the threads 224. The inner air gaps 270 are between the threads 224 and the first bore 240, and between the threads 224 and the second bore 250. The thread insert 220 also defines outer air gaps 280. The first bore 240 is between one or more of the first outer air gaps 280 and the threads 224. The second bore 240 is between one or more of the second outer air gaps 280 and the threads 224. The outer air gaps 280 may be linear as illustrated, or curved at any suitable angle. A first series of the outer air gaps 280 may extend parallel to the first bore 240. And a second series of the outer air gaps 280 may extend parallel to the second bore 250. The first series of the outer air gaps 280 may include two or more spaced apart, or discontinuous, air gaps. And the second series of the outer air gaps 280 may include two or more spaced apart, or discontinuous air gaps. The air gaps 280 may be of any suitable shape such as slots, circles, ovals, polygonal shapes, or a combination of shapes.

The thread insert 220 is advantageously configured to position the first heating element and the second heating element 310, 320 adjacent to the threads 224 to concentrate heat at the threads 224, and to evenly distribute heat along the threads 224. The inner air gaps 270 and the outer air gaps 280 further facilitate even heat distribution along the threads 224. For the example illustrated, the temperature delta along the threads 224 is only about 4.1° C. One skilled in the art will appreciate that the present disclosure provides numerous additional advantages as well, such as improving heat induced crystallinity in the finish of the container.

The thread insert 220 further includes a resistance temperature detector (RTD) 290. The RTD 290 is a sensor configured to change resistance as the temperature of the sensor changes. The resistance increases as the temperature of the sensor increases. The resistance versus temperature relationship is predetermined and repeatable over time. The RTD 290 may be configured as a thermocouple. The RTD 290 is a passive device, and does not produce an output on its own. Any suitable external electronic device is included to measure the resistance of the RTD 290 by passing a small electrical current through the RTD 290 to generate a voltage. Typically, 1 mA or less measuring current, 5 mA maximum without risk of self-heating. The RTD 290 may be positioned at any suitable location on the thread insert 22. For example and as illustrated in FIG. 9, the RTD is between the first bore 240 and the second bore 250, and adjacent to the notch or cut-out 238. The RTD 290 is configured to measure temperature at the outer mold surface 230 of the notch or cut-out 238, and provide feedback to the first and second heating elements 310, 320 for making temperature adjustments to the threadsplit temperature in real-time.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thread insert for a blow mold assembly configured to form a polymeric container, the thread insert comprising:

an inner mold surface defining threads, the inner mold surface configured to form a finish of the container;

a first bore defined by the thread insert;

at least one inner air gap between the threads and the first bore; and a first heating element seated within the first bore and configured to heat the inner mold surface.

2. The thread insert of claim 1, further comprising:

a second bore defined by the thread insert; and a second heating element seated within the second bore and configured to heat the inner mold surface.

3. The thread insert of claim 2, wherein at least one of the first heating element and the second heating element is a variable wattage heater configured to be heated to different temperatures along a length thereof.

4. The thread insert of claim 2, wherein the first bore and the second bore both extend from the inner mold surface to an outer mold surface opposite to the inner mold surface.

5. The thread insert of claim 4, wherein the first bore and the second bore are non-parallel to each other.

6. The thread insert of claim 4, wherein the inner mold surface defining the threads is between the first bore and the second bore.

7. The thread insert of claim 1, wherein the inner air gap is curved to match a curvature of the inner mold surface.

8. The thread insert of claim 1, wherein the inner air gap includes at least one of a slot, a circle, an oval, and a polygonal shape.

9. The thread insert of claim 1, further comprising at least one outer air gap on a side of the first bore that is opposite to the inner air gap.

10. The thread insert of claim 9, wherein the outer air gap includes at least one of a slot, a circle, an oval, and a polygonal shape.

11. The thread insert of claim 9, wherein the outer air gap is curved or linear.

12. The thread insert of claim 9, wherein the outer air gap is a first outer air gap, the thread insert further including at least a second outer air gap that is aligned with and spaced apart from the first outer air gap.

13. A thread insert for a blow mold assembly configured to form a polymeric container, the thread insert comprising:

an inner mold surface defining threads, the inner mold surface configured to form a finish of the container;

a first bore defined by the thread insert;

at least one of a first inner air gap between the threads and the first bore;

a first heating element seated within the first bore and configured to heat the inner mold surface and the threads;

a second bore defined by the thread insert, the second bore is non-parallel to the first bore;

a second heating element seated within the second bore and configured to heat the inner mold surface and the threads; and an outer mold surface opposite to the inner mold surface, the outer mold surface defines a notch including a first opening of the first bore and a second opening of the second bore.

14. The thread insert of claim 13, wherein the first bore extends along a first line and the second bore extends along a second line, the first line and the second line intersect in the notch defined by the outer mold surface.

15. The thread insert of claim 13, wherein the first bore and the second bore extend non-parallel to each other.

16. The thread insert of claim 13, further comprising a first inner air gap defined by the thread insert between the first bore and the threads, and a second inner air gap defined by the thread insert between the second bore and the threads.

17. The thread insert of claim 16, wherein the first inner air gap and the second inner air gap are both curved to match a curvature of the inner mold surface.

18. The thread insert of claim 16, wherein the first inner air gap and the second inner air gap each include at least one of a slot, a circle, an oval, and a polygonal shape.

19. The thread insert of claim 13, further comprising:

a first outer air gap defined by the thread insert on a side of the first bore that is opposite to the first inner air gap; and a second outer air gap defined by the thread insert on a side of the second bore that is opposite to a second inner air gap.

20. The thread insert of claim 19, wherein the first outer air gap and the second outer air gap extend linearly.

21. The thread insert of claim 13, further comprising a temperature sensor between the first heating element and the second heating element.

22. The thread insert of claim 21, wherein the temperature sensor is configured to change resistance as temperature of the thread insert changes.

* * * * *